Patented June 26, 1923.

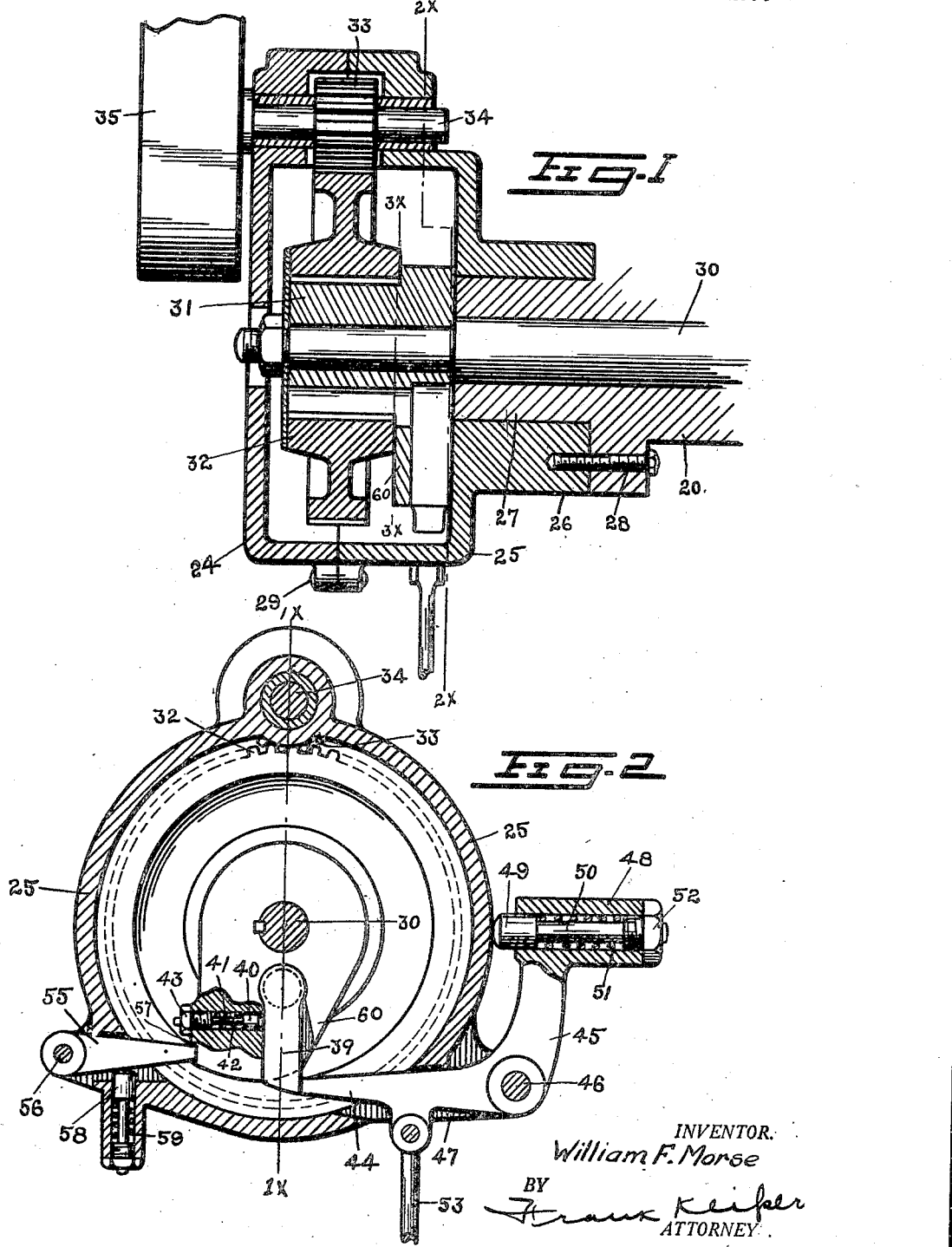

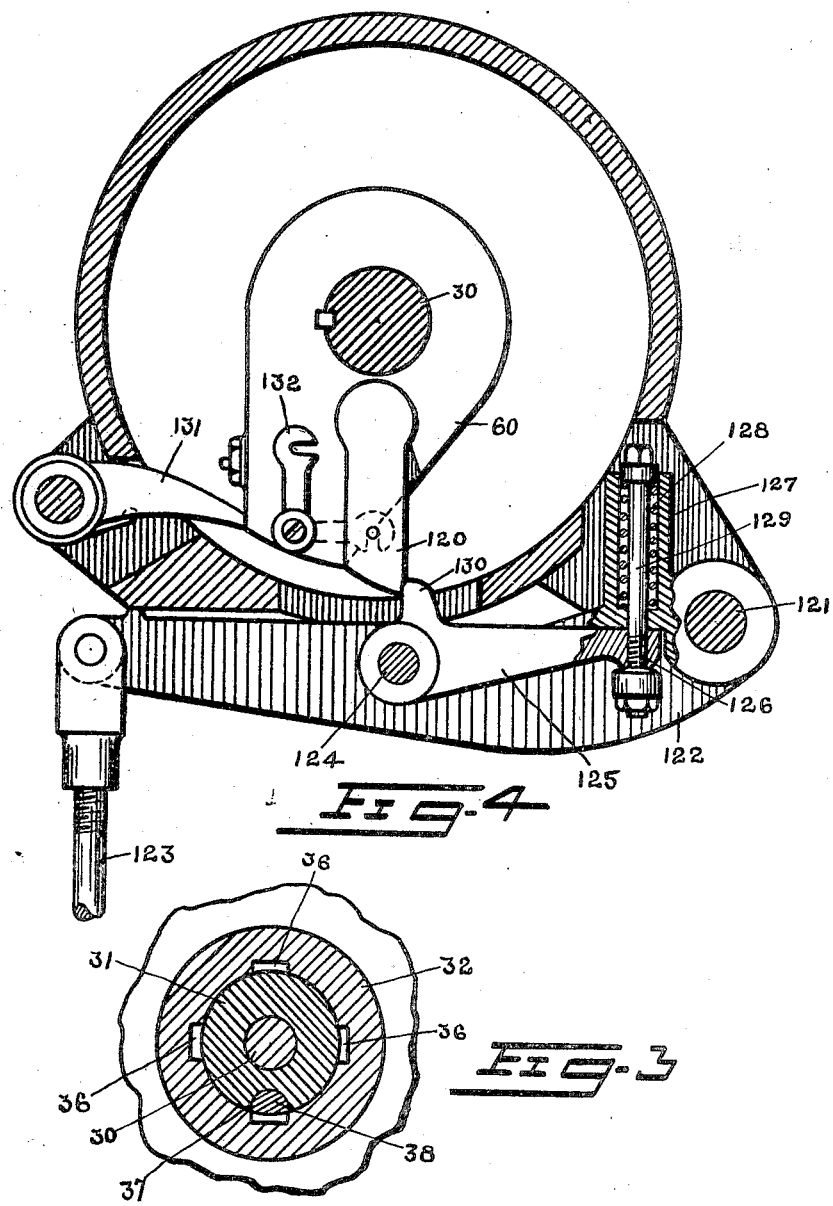

1,459,851

UNITED STATES PATENT OFFICE.

WILLIAM F. MORSE, OF ROCHESTER, NEW YORK, ASSIGNOR TO SAMUEL R. PARRY, OF ROCHESTER, NEW YORK.

CLUTCH.

Original application filed June 29, 1918, Serial No. 242,648. Divided and this application filed September 28, 1920. Serial No. 413,399.

*To all whom it may concern:*

Be it known that I, WILLIAM F. MORSE, a citizen of the United States, residing at Rochester, in the county of Monroe and State of New York, have invented certain new and useful Improvements in Clutches, of which the following is a specification.

The object of this invention is to provide a new and improved form of clutch to be used more especially in machines for covering paper boxes, although it is adapted for use in other types of machines as well.

This and other objects of the invention will be fully illustrated in the drawings, described in the specification and pointed out in the claims at the end thereof.

In the accompanying drawings,

Fig. 1 is a vertical section taken on the line $1^x$—$1^x$ of Fig. 2.

Fig. 2 is a vertical section on the line $2^x$—$2^x$ of Fig. 1.

Fig. 3 is a vertical section on the line $3^x$—$3^x$ of Fig. 1.

Fig. 4 is a vertical cross sectional view of a modified form of the clutch.

In the drawing, like reference numerals indicate like parts.

This application is a divisional application of my prior application No. 242,648, filed June 29, 1918.

In the drawings, as shown in Fig. 1, the clutch mechanism is surrounded by a casing which is formed in two sections 24 and 25, divided vertically. The inner section 25 has a hub 26 provided thereon into which one side of the horizontal bearing block 27 is adapted to engage. This bearing block is formed on a bracket 20, forming part of the machine frame. A bolt 28 passes thru a portion of the bracket 20 below the bearing block 27 and is threaded into the hub 26 and holds the section 25 of the casing firmly in place on the bracket. Bolts 29 are threaded into lugs provided on the periphery of both of the casing sections 24 and 25 to hold these sections together.

The driving shaft 30 is mounted to rotate in the bearing 27 formed in the bracket 20 and has an extension of reduced diameter projected into the inside of the casing on which the clutch member 31 and its driving gear are mounted.

The driving gear 32 meshes with the pinion 33 keyed to the jack shaft 34, which shaft is mounted in a suitable bearing provided in each section of the casing. A pulley 35 is keyed to the outside of the jack shaft 34 for driving the clutch mechanism. The gear 32 is provided in its hub with key ways 36, 36, four of them being shown. The pulley 35 and gears 33 and 32 rotate continuously. The gear 33 is intermittently connected to the spindle or male member 31 as follows:

On the outside of the spindle 31 is provided an arm 60 integral therewith. In the spindle 31 is provided a recess 37 in which is mounted to rock an oval shaped key 38. On the end of this key is provided a lever or crank 39 adapted to swing in a seat in the arm 60 as shown in Fig. 2. This lever or crank 39 is strongly pressed in one direction by the stud 40, which is actuated by the compression spring 41 which surrounds the pin 42 forming a part of the stud, which pin passes thru the lug 43, which is perforated to receive it.

The lever 39 is held in the position shown in Fig. 2 by the latch 44 forming part of the bell crank 45, pivoted at 46 to a lug 47 mounted on the casing section 25. The upper end of the bell crank 45 is provided with the casing 48 in which is mounted to slide a stud 49 having a pin 50 formed thereon around which is coiled a compression spring 51. A plug 52 makes threaded engagement with the end of the casing 48 and is perforated to receive the pin 50 so that it may slide therein. Connected to the latch 44 is the link 53 which is connected to a treadle or any other suitably operating device by which it may be operated so that the latch 44 will be thrown down out of engagement with the lever 39. This permits the spring 41 to expand, pressing the stud 40 forward, which in turn rocks the lever 39 and the oval shaped key 38, throwing it into engagement with the next key way 36 by which the members of the clutch are connected so that the male member must rotate with the female member and in the same direction. The parts will rotate together as long as the latch 44 remains drawn down. As soon as the link 53 is released, the spring 51 will expand and draw the latch up, causing it to engage the crank 39 as it approaches, rocking the key out of engagement with the key way 36.

This will bring the male member 31 to a stop and permit the female member 32 of the clutch to rotate independently thereof.

To prevent any rebound of the spindle 31, a latch 55 is provided, pivoted at 56 on a lug provided on the casing 25, which latch engages with the shoulder 57. The latch is pressed up into engagement therewith by means of the stud 58 and spring 59, and has a limited movement in the casing.

In Fig. 4 I have shown a modified form of the clutch mechanism. The arm 60 is shown keyed on the shaft 30. In the arm 60 is pivotally mounted a crank 120. Mounted on the case is a stud 121 on which swings a lever 122 operated by a link 123. On the lever 122 is carried a stud 124. On the stud 124 is pivotally mounted the latch 125. This latch is perforated at the end as indicated at 126. On the arm immediately above this perforation is provided a sleeve 127 in which is contained a compression spring 128. A bolt 129 is provided, having nuts and washers on each end thereof, forming heads. The head on the upper end holds the spring 128 in place against the end of the crank 125 and the head of the lower end holds the crank 125 in place against the sleeve 127. The latch 125 has a projection 130 thereon which engages the crank 120.

The operation of this clutch is as follows: When the link 123 is pulled down, the lever 122 is drawn down with it, carrying down the latch 125, releasing the crank 120, which is then thrown forward by a spring similar to that shown in Fig. 2, closing the clutch as above described and causing the rotation thereof. When the lever 122 returns to the position shown in Fig. 4, the latch 125 engages the crank 120 and opens the clutch and stops the rotation thereof. The momentum of the moving parts of the clutch causes it to strike quite a blow when the parts are brought to rest and the shock is taken up by the spring 128 as follows:

The crank 120 strikes the projection 130 and rocks the latch 125 around the stud 124, causing the outer end to draw down on the bolt 129 and compress the spring 128. The spring then expands and brings the part back to normal. A pawl 131 is provided which engages the arm from the rear side thereof and prevents the rebound thereof when the clutch is stopped. A latch 132 is provided which locks the crank 120 from swinging forward and makes the clutch inoperative.

I claim:

1. A clutch for a box covering machine, comprising a hub, having a keyway therein, a sleeve on which said hub is adapted to rotate, said sleeve having a key therein, a crank for rocking said key into engagement with the keyway in the hub and causing the sleeve and hub to rotate together, a spring back of said crank, an arm integral with said sleeve having a recess therein, said crank swinging in said recess and projecting beyond it, a latch engaging the forward side of said crank to move it and disengage said key from said keyway, a latch engaging the rear side of said arm to prevent backward movement thereof, said latches being pivoted on a stationary casing and being substantially in line with and pointing toward each other to hold said arm stationary between said latches.

2. A clutch comprising a hub having a keyway therein, a sleeve, mounted to rotate within said hub, a key mounted to rock in said sleeve, an arm formed on the end of said sleeve, said key projecting into said arm, a crank formed on the end of said key, said crank being nested into said arm and allowed a limited movement therein, said crank slightly projecting out from said arm, a spring pressed pin acting on said crank to rock said crank independently of said arm on the release of said arm, a stationary casing surrounding said clutch, a lever pivoted to one side of said casing, a latch engaging the outer end of said crank, said latch being yieldingly mounted on said lever, said lever being adapted to disengage said latch from said crank, a spring pressed latch mounted on said stationary casing opposite to said lever, said spring pressed latch operating to hold the outer end of said latch mounted on arm between it and said latch mounted on said lever to prevent any motion of said arm in either direction after each revolution thereof and immediately after said key has been disengaged from the keyway of said hub.

In testimony whereof I affix my signature.

WILLIAM F. MORSE.